US008507032B2

(12) United States Patent  (10) Patent No.: US 8,507,032 B2
Winarski (45) Date of Patent: Aug. 13, 2013

(54) ORIENTATION OF NANOTUBES CONTAINING MAGNETIC NANOPARTICLES IN A MAGNETIC STORAGE MEDIUM

(75) Inventor: Tyson York Winarski, Washington, DC (US)

(73) Assignee: Sigma Pro Ltd. LLC, Dover, DE (US)

( * ) Notice: Subject to any disclaimer, the term of this patent is extended or adjusted under 35 U.S.C. 154(b) by 701 days.

(21) Appl. No.: 12/403,729

(22) Filed: Mar. 13, 2009

(65) Prior Publication Data

US 2009/0280242 A1 Nov. 12, 2009

(51) Int. Cl.
*B05D 3/10* (2006.01)
(52) U.S. Cl.
USPC .......................................................... 427/130
(58) Field of Classification Search
USPC ................. 427/132, 212, 550, 547; 428/826, 428/827, 828, 1, 831, 831.1, 832, 832.1, 428/832.3, 833, 836, 836.1, 836.2, 839, 840, 428/844.6, 846; 977/773
See application file for complete search history.

(56) References Cited

U.S. PATENT DOCUMENTS

| | | | |
|---|---|---|---|
| 4,333,985 A | 6/1982 | Shirahata | |
| 4,393,110 A * | 7/1983 | Fukuda | 428/173 |
| 6,324,032 B1 * | 11/2001 | Ohtsuka et al. | 360/131 |
| 6,465,132 B1 | 10/2002 | Jin | |
| 7,419,624 B1 | 9/2008 | Smalley | |
| 7,687,159 B2 | 3/2010 | Chen | |
| 7,687,160 B2 | 3/2010 | Winarski | |
| 7,695,769 B2 | 4/2010 | Watanabe | |
| 7,976,966 B2 | 7/2011 | Winarski | |
| 2003/0175462 A1 * | 9/2003 | Nishino et al. | 428/36.91 |
| 2003/0190278 A1 | 10/2003 | Wang | |
| 2004/0071951 A1 * | 4/2004 | Jin | 428/323 |
| 2004/0106009 A1 * | 6/2004 | Nakamura et al. | 428/694 R |
| 2004/0127130 A1 | 7/2004 | Yi | |

(Continued)

FOREIGN PATENT DOCUMENTS

| | | | |
|---|---|---|---|
| JP | 2005-056534 | * | 3/2005 |
| JP | 2005056534 | | 3/2005 |

OTHER PUBLICATIONS

Tyagi, P.K., et al., "Preparation of Ni-Filled Carbon Nanotubes for Key Potential Applications in Nanotechnology," Thin Solid Films: Proceedings of the 31st International Conference on Metallurgical Coatings and Thin Films 469-470:127-130, Dec. 2004.

*Primary Examiner* — Michael Cleveland
*Assistant Examiner* — Tabassom Tadayyon Eslami
(74) *Attorney, Agent, or Firm* — Christensen O'Connor Johnson Kindness PLLC

(57) ABSTRACT

A magnetic storage medium is formed of magnetic nanoparticles that are encapsulated within nanotubes (e.g., carbon nanotubes), which are arranged in a substrate to facilitate the reading and writing of information by a read/write head. The substrate may be flexible or rigid. Information is stored on the magnetic nanoparticles via the read/write head of a storage device. These magnetic nanoparticles are arranged into data tracks to store information through encapsulation within the carbon nanotubes. As carbon nanotubes are bendable, the carbon nanotubes may be arranged on flexible or rigid substrates, such as a polymer tape or disk for flexible media, or a glass substrate for rigid disk. A polymer may assist holding the nano-particle filled carbon-tubes to the substrate. Magnetic fields may be applied to draw the carbon nanotubes into data tracks and orient the carbon nanotubes within the data tracks.

28 Claims, 18 Drawing Sheets

Magnetically Enhanced Cure of Magnetic Tape

(56) References Cited

U.S. PATENT DOCUMENTS

| | | |
|---|---|---|
| 2005/0058805 A1* | 3/2005 | Kimura et al. ............... 428/113 |
| 2005/0068679 A1 | 3/2005 | Chen |
| 2005/0079282 A1 | 4/2005 | Jin |
| 2005/0081400 A1* | 4/2005 | Matsumiya et al. ........... 33/706 |
| 2005/0142385 A1 | 6/2005 | Jin |
| 2005/0170169 A1 | 8/2005 | Watanabe et al. |
| 2005/0214356 A1 | 9/2005 | Joyce |
| 2005/0239948 A1* | 10/2005 | Haik et al. .................... 524/496 |
| 2005/0254168 A1 | 11/2005 | Inomata |
| 2006/0065136 A1* | 3/2006 | Takahashi et al. ............. 101/3.1 |
| 2006/0075418 A1 | 4/2006 | Kurt |
| 2006/0099461 A1 | 5/2006 | Jones |
| 2007/0054154 A1* | 3/2007 | Leu ........................... 428/836.3 |
| 2007/0158610 A1 | 7/2007 | Hong |
| 2007/0184969 A1 | 8/2007 | Dubois et al. |
| 2007/0237987 A1* | 10/2007 | Winarski .................... 428/836.3 |
| 2007/0243124 A1* | 10/2007 | Baughman et al. ........ 423/447.1 |
| 2007/0290384 A1 | 12/2007 | Kodas et al. |
| 2008/0014442 A1 | 1/2008 | Rida |
| 2008/0260941 A1 | 10/2008 | Jin |
| 2009/0053512 A1 | 2/2009 | Pyun et al. |
| 2009/0202644 A1* | 8/2009 | Gogotsi et al. ................ 424/489 |
| 2009/0220561 A1* | 9/2009 | Jin et al. ....................... 424/423 |
| 2010/0014187 A1 | 1/2010 | Winarski |
| 2010/0285337 A1 | 11/2010 | Winarski |
| 2010/0291412 A1 | 11/2010 | Winarski |

* cited by examiner

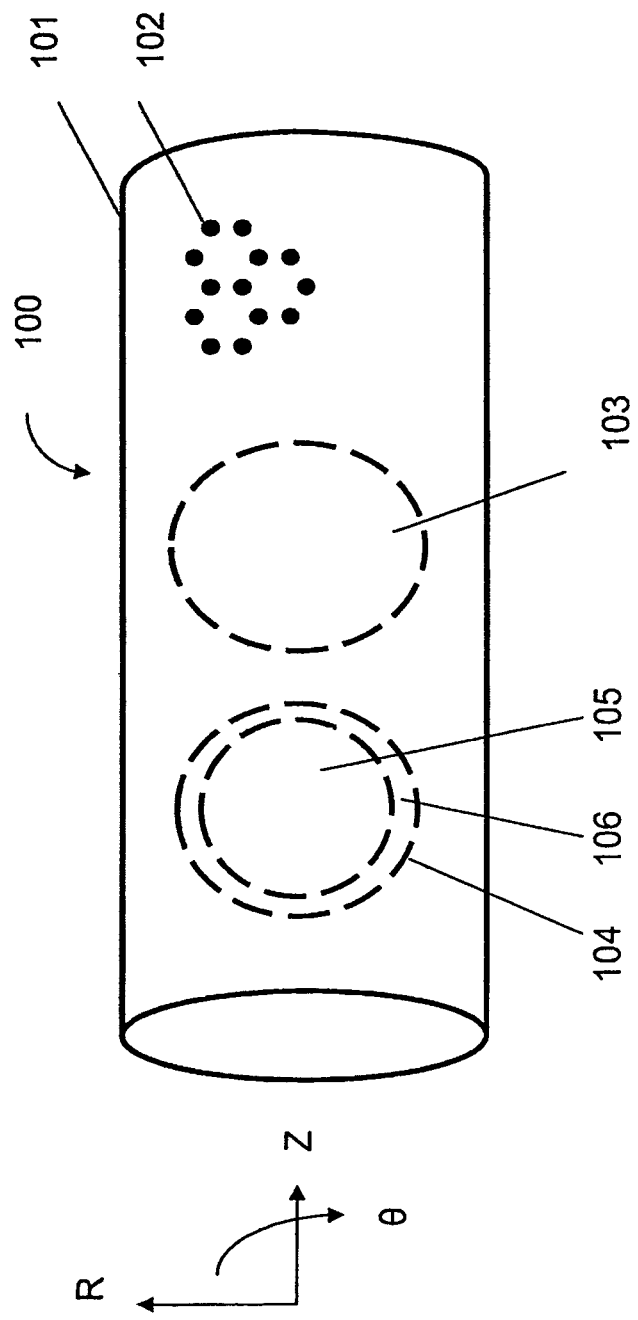
FIG. 1 – Nanotube with encapsulated magnetic nanoparticles

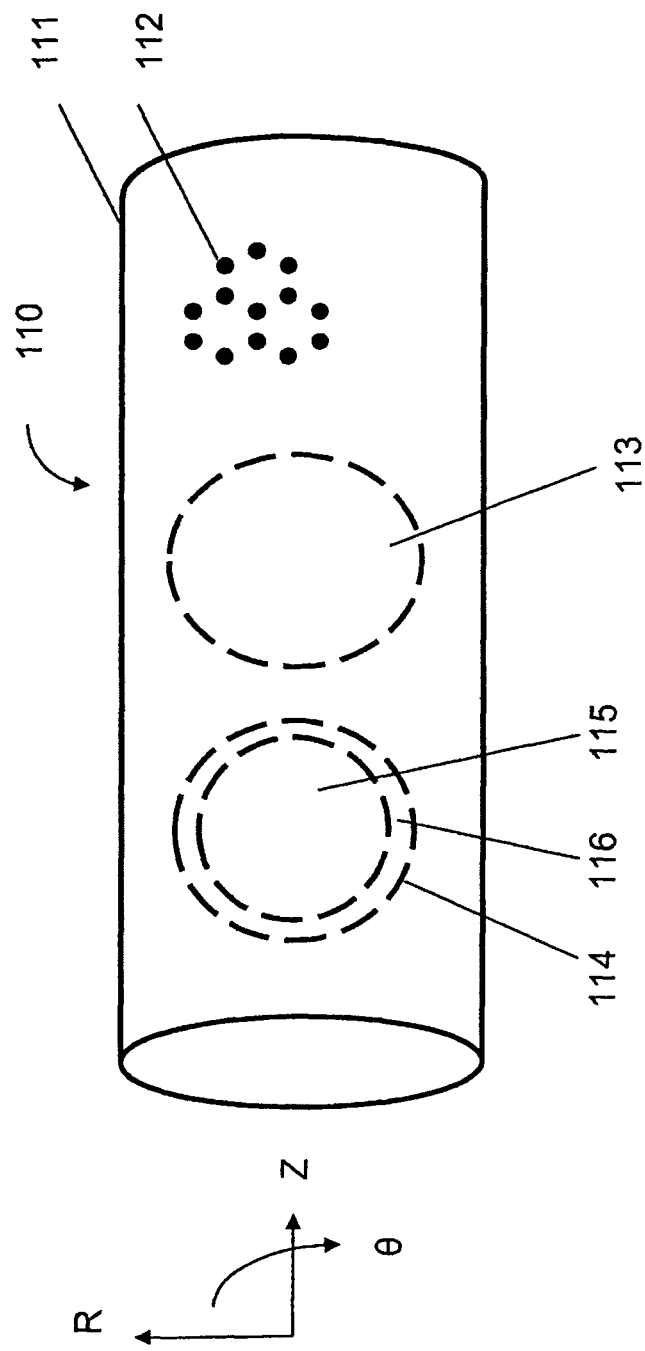
FIG. 2 – Nanotube with encapsulated magnetic-shunt nanoparticles

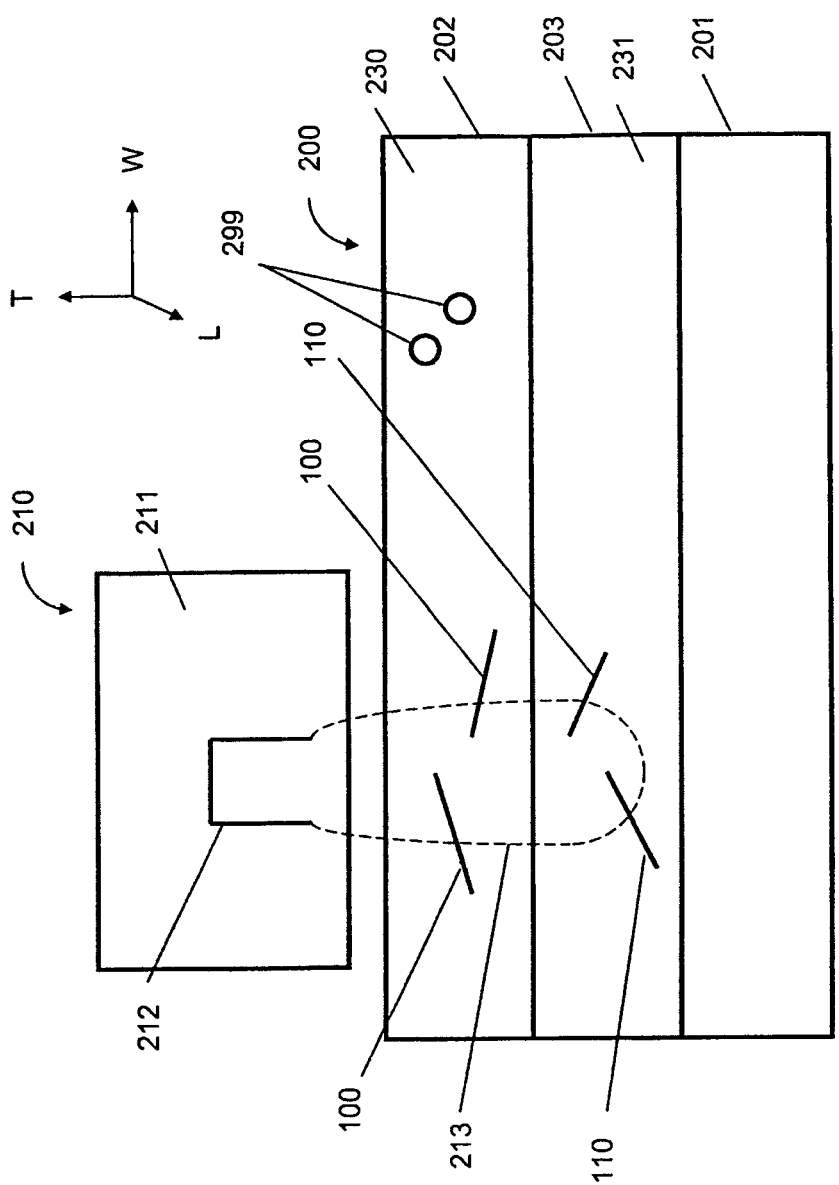
FIG. 3 – Cross-section of Magnetic Medium

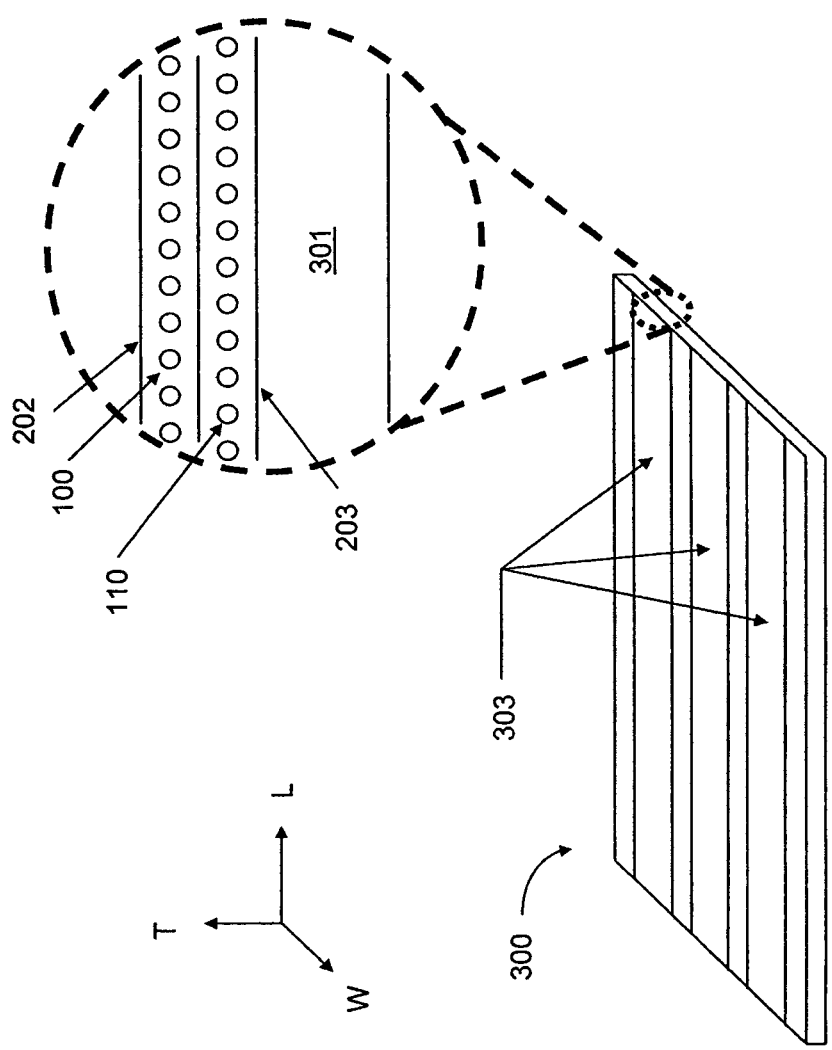
FIG. 4 View of Magnetic Tape

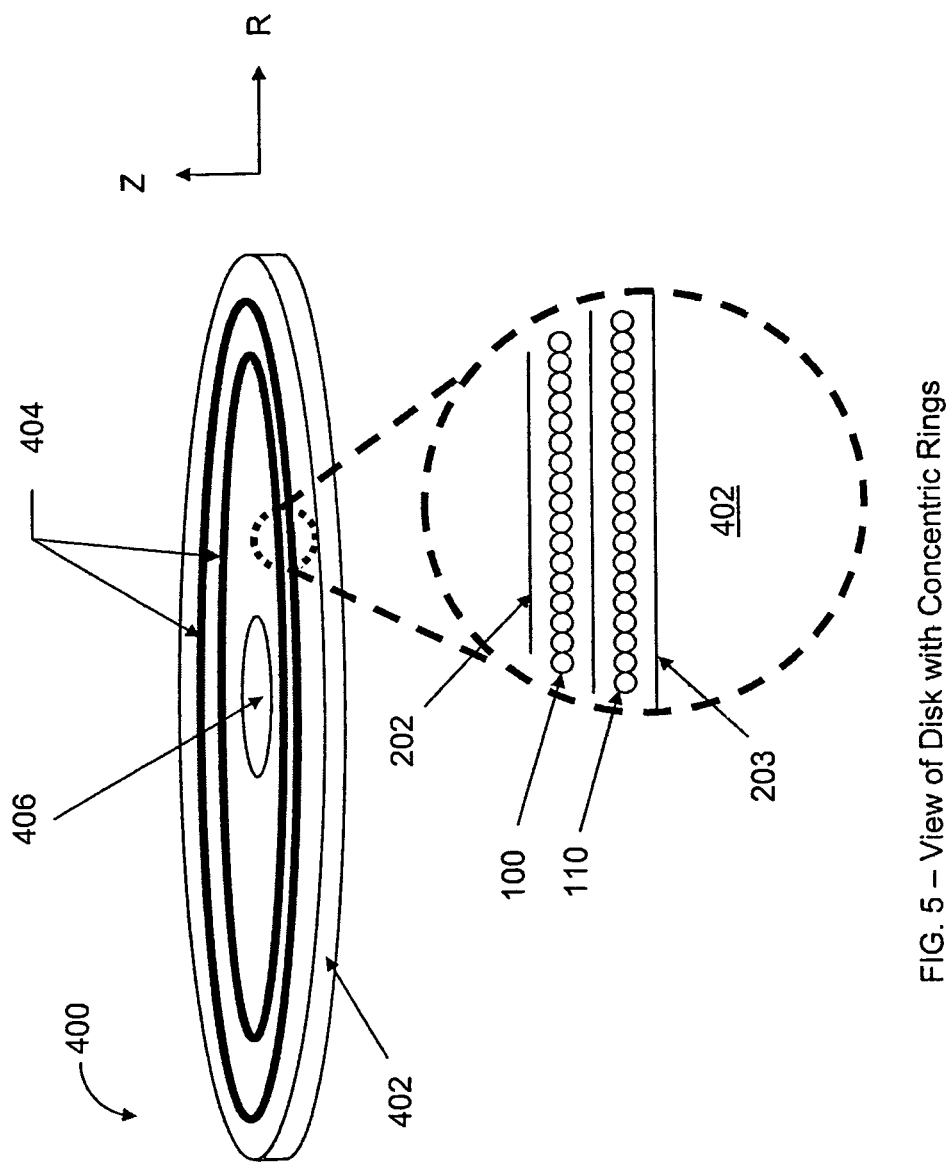
FIG. 5 – View of Disk with Concentric Rings

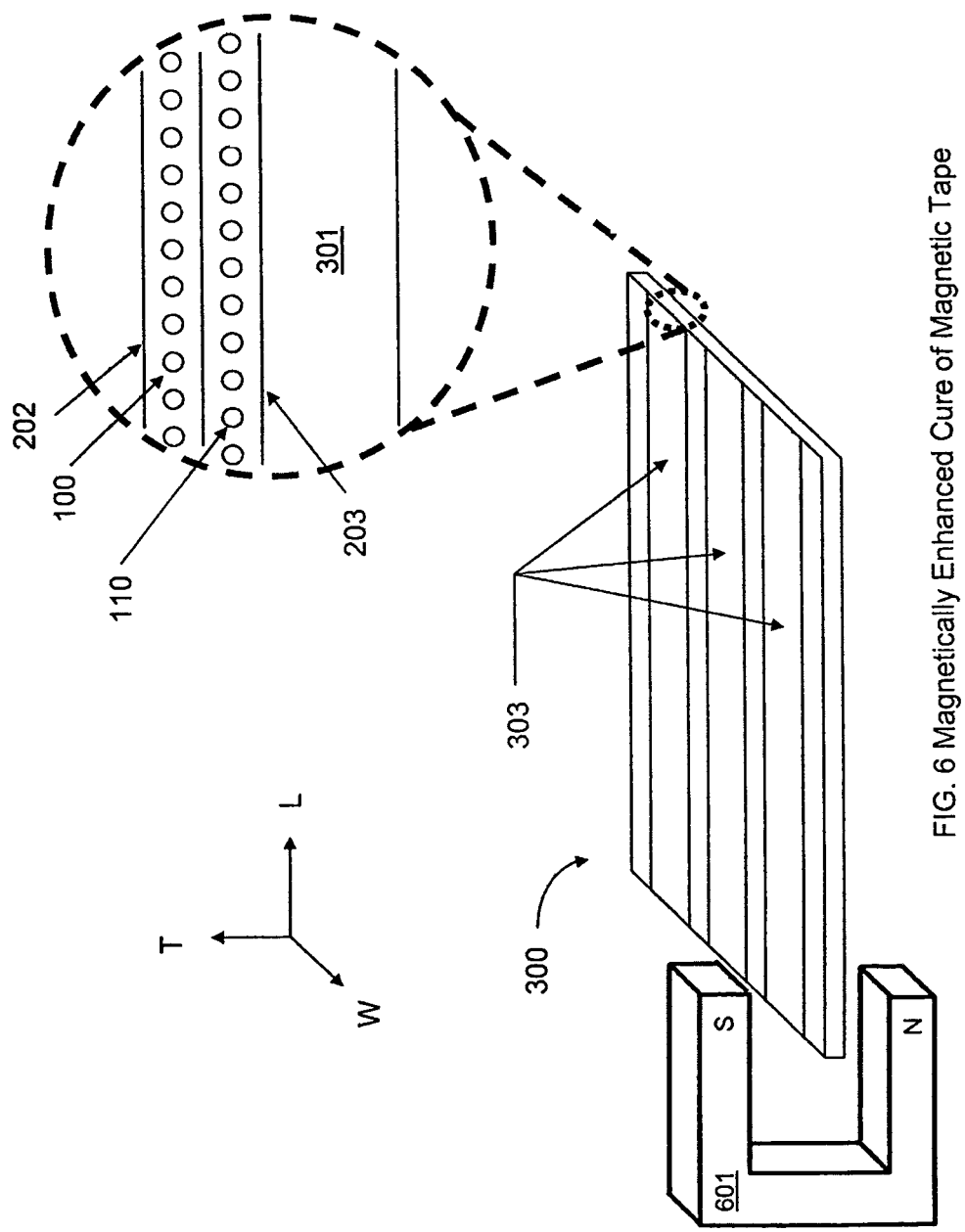
FIG. 6 Magnetically Enhanced Cure of Magnetic Tape

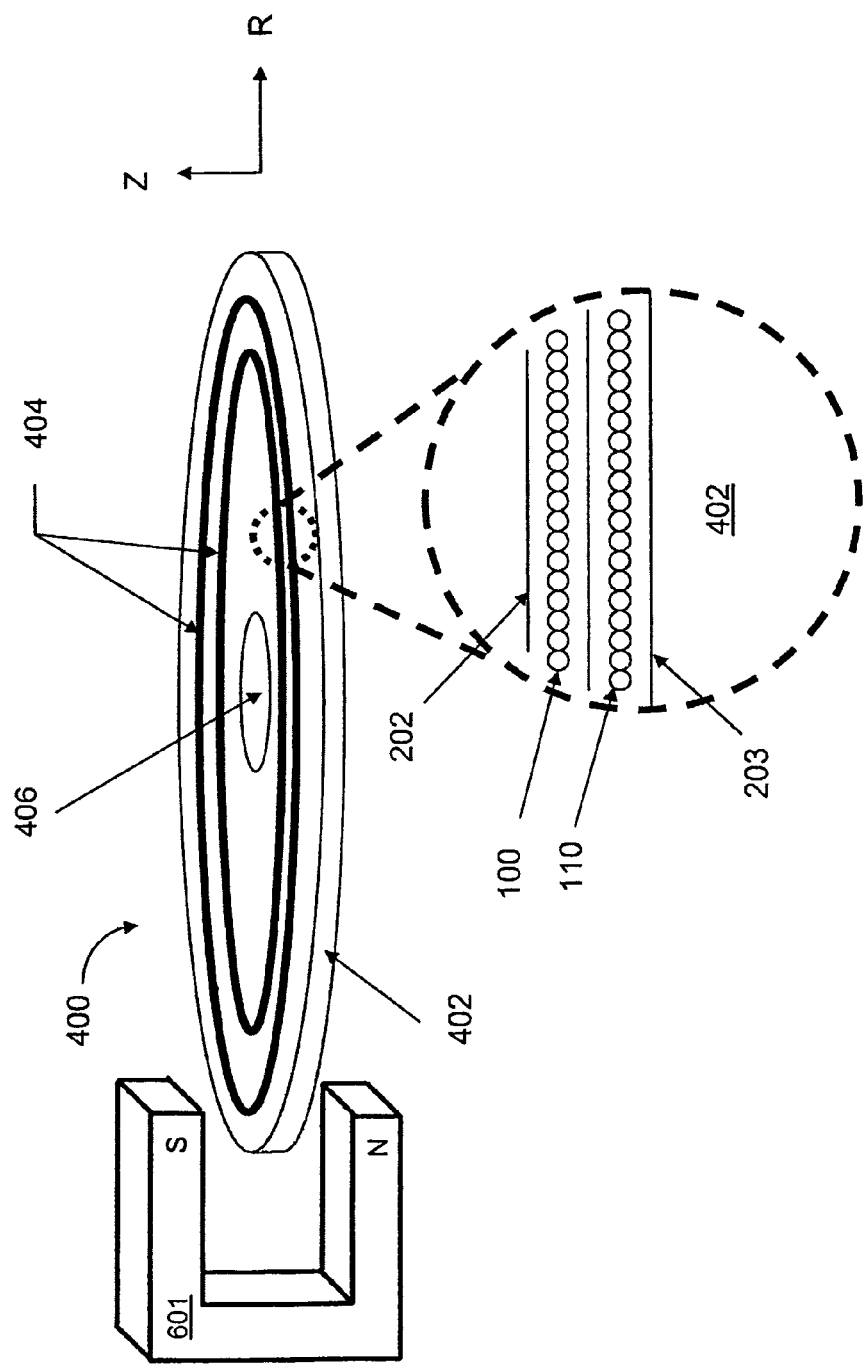
FIG. 7 – Magnetically Enhanced Cure of Disk with Concentric Rings

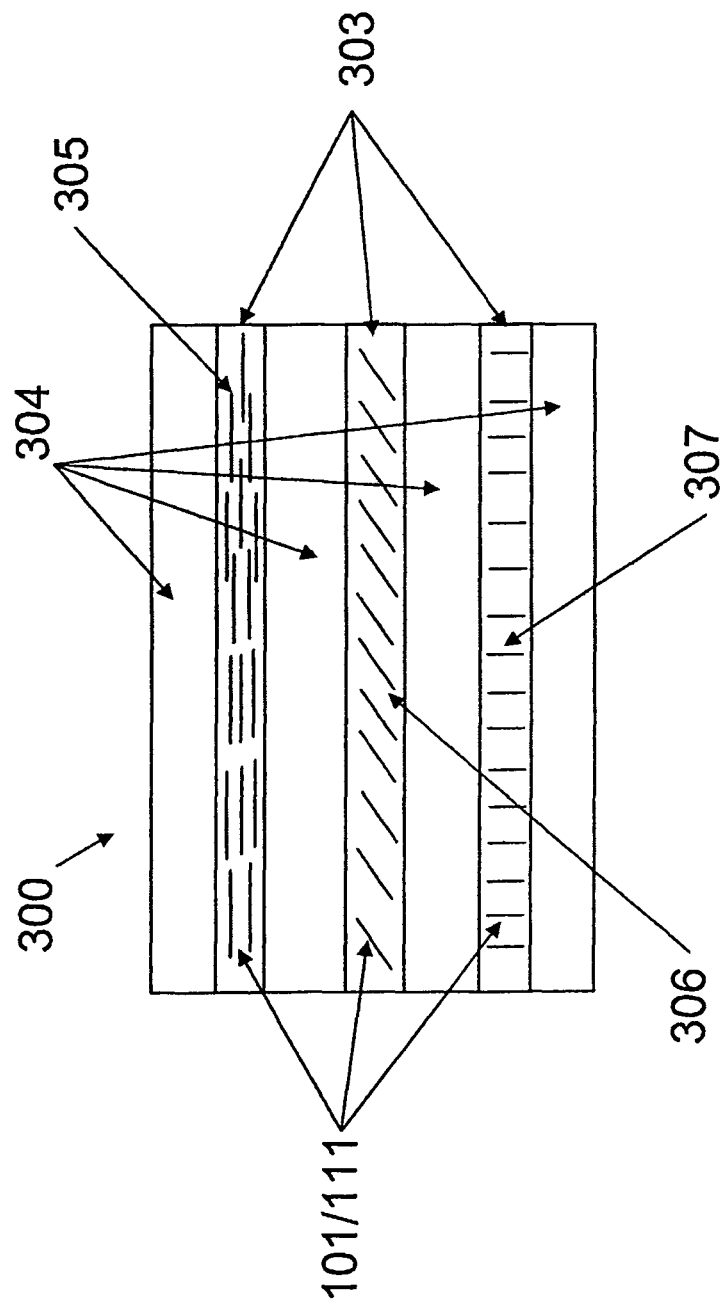
FIG. 8 – A Magnetic Tape Having Carbon Nanotubes In Various Orientations Within A Data Track

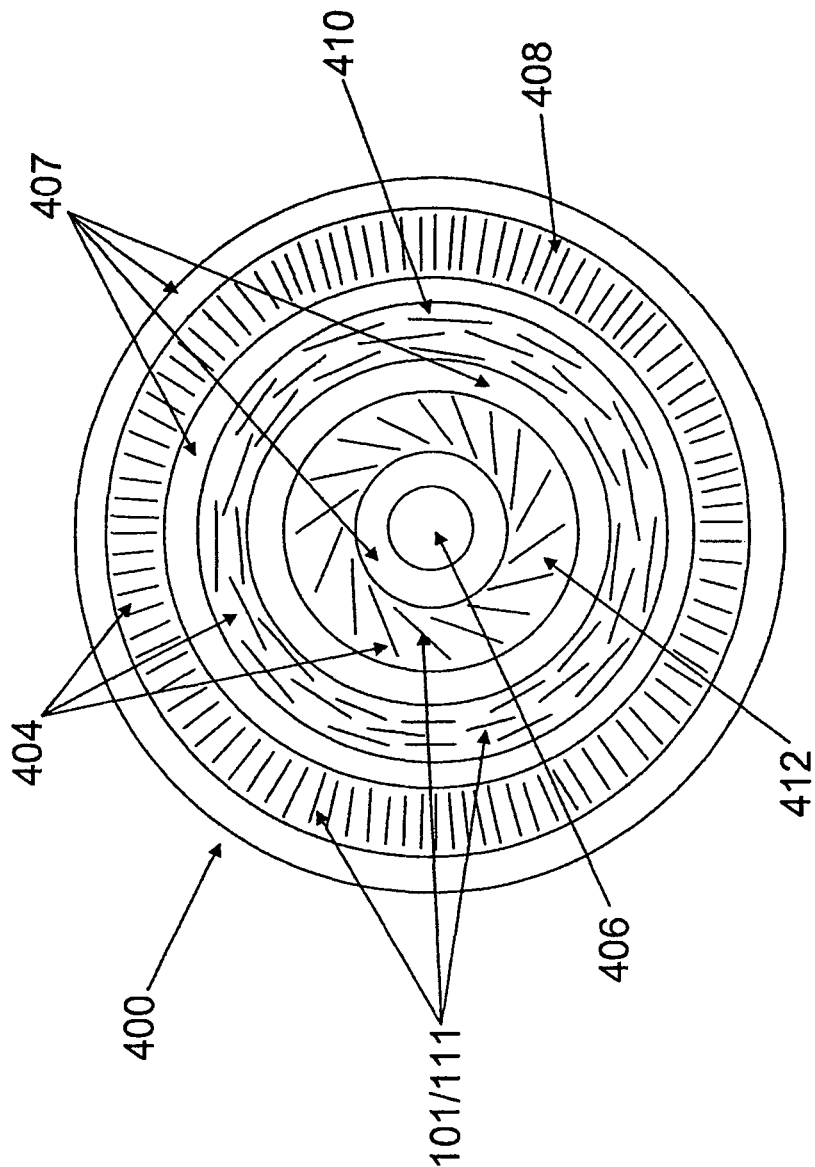
FIG. 9 – A Magnetic Disk Having Carbon Nanotubes In Various Orientations Within An Annular Data Track

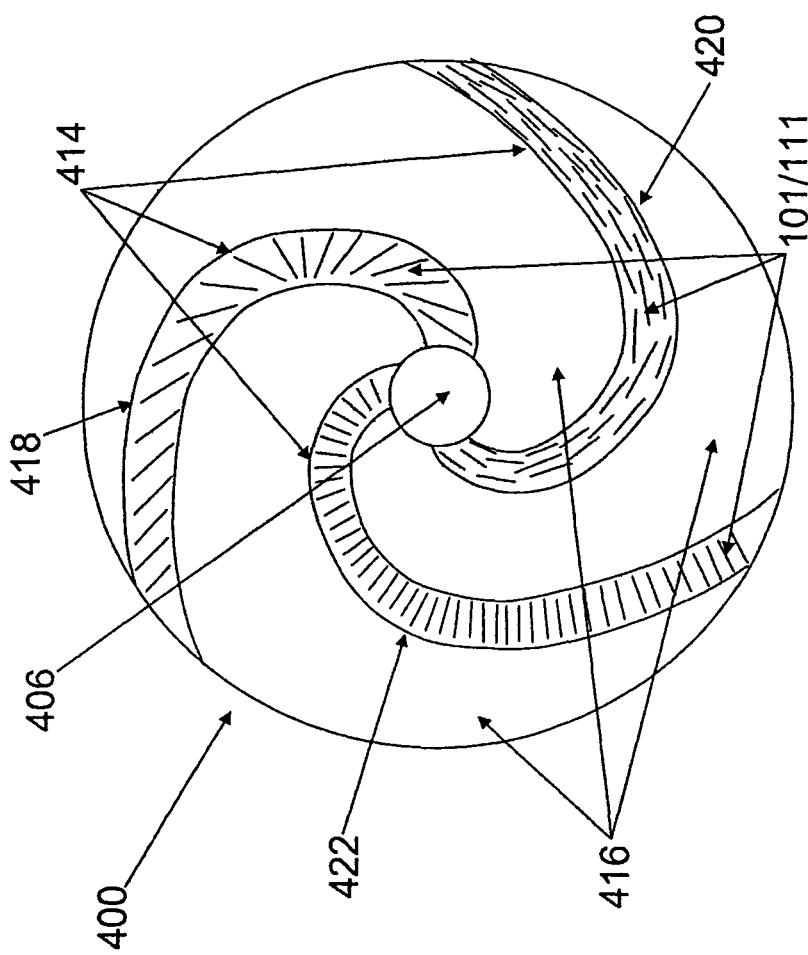
FIG. 10 – A Magnetic Disk Having Carbon Nanotubes In Various Orientations Within A Spiral Data Track

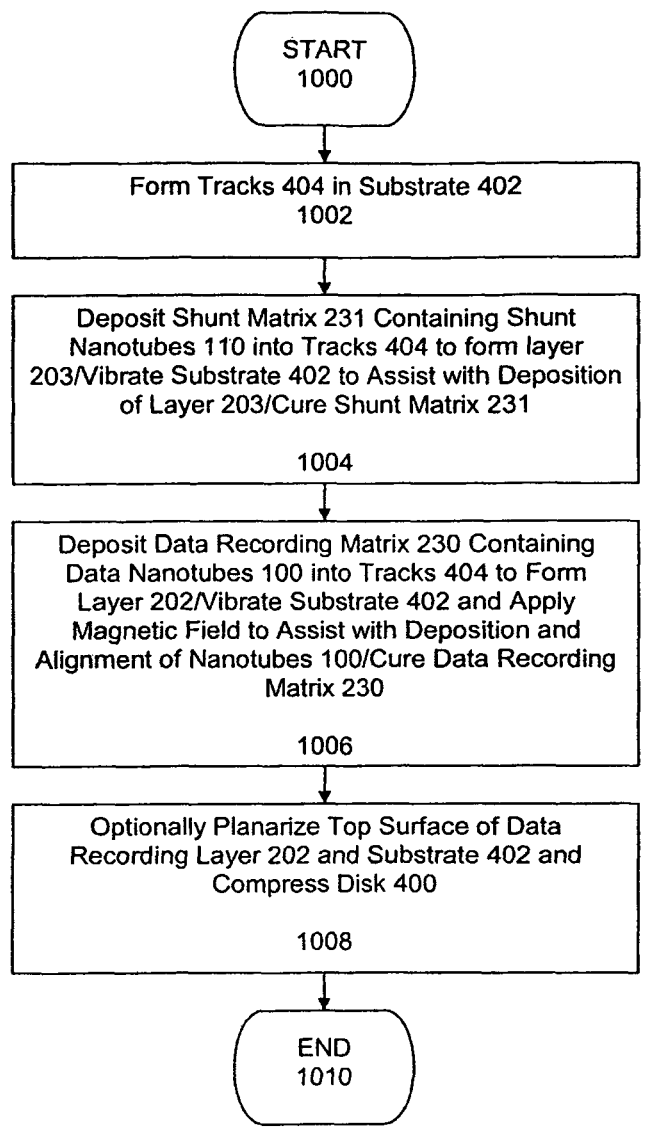
FIG. 11 – A Flow Chart for Manufacturing a Magnetic Disk Having Carbon Nanotubes

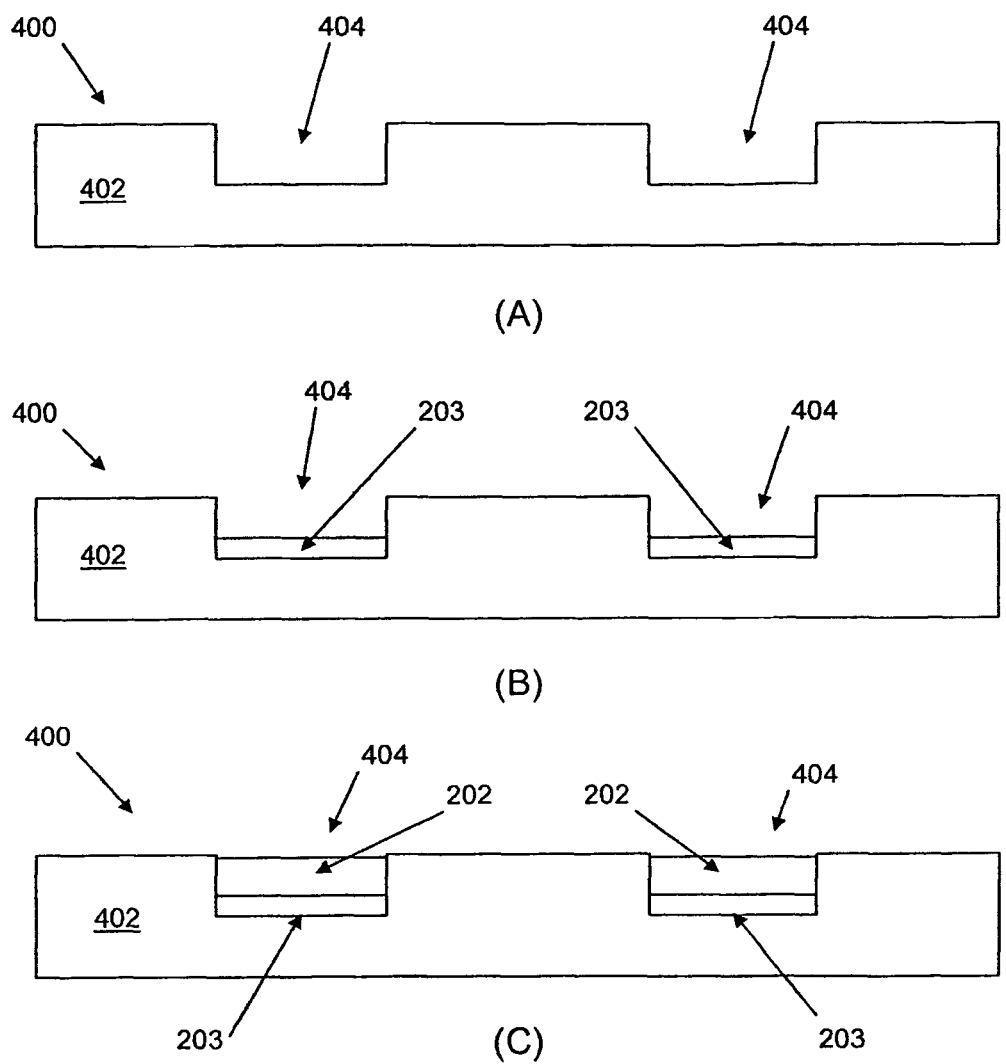
FIG. 12 – Cross-Sectional Flow Diagram for Manufacturing a Magnetic Disk Having Carbon Nanotubes

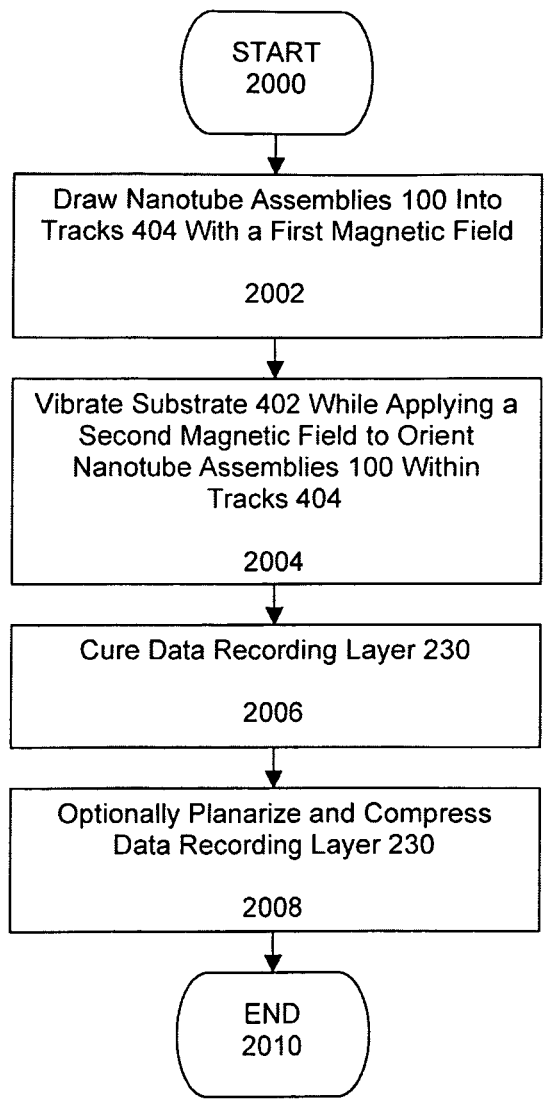
FIG. 13 – A Flow Chart for Manufacturing a Data Recording Layer

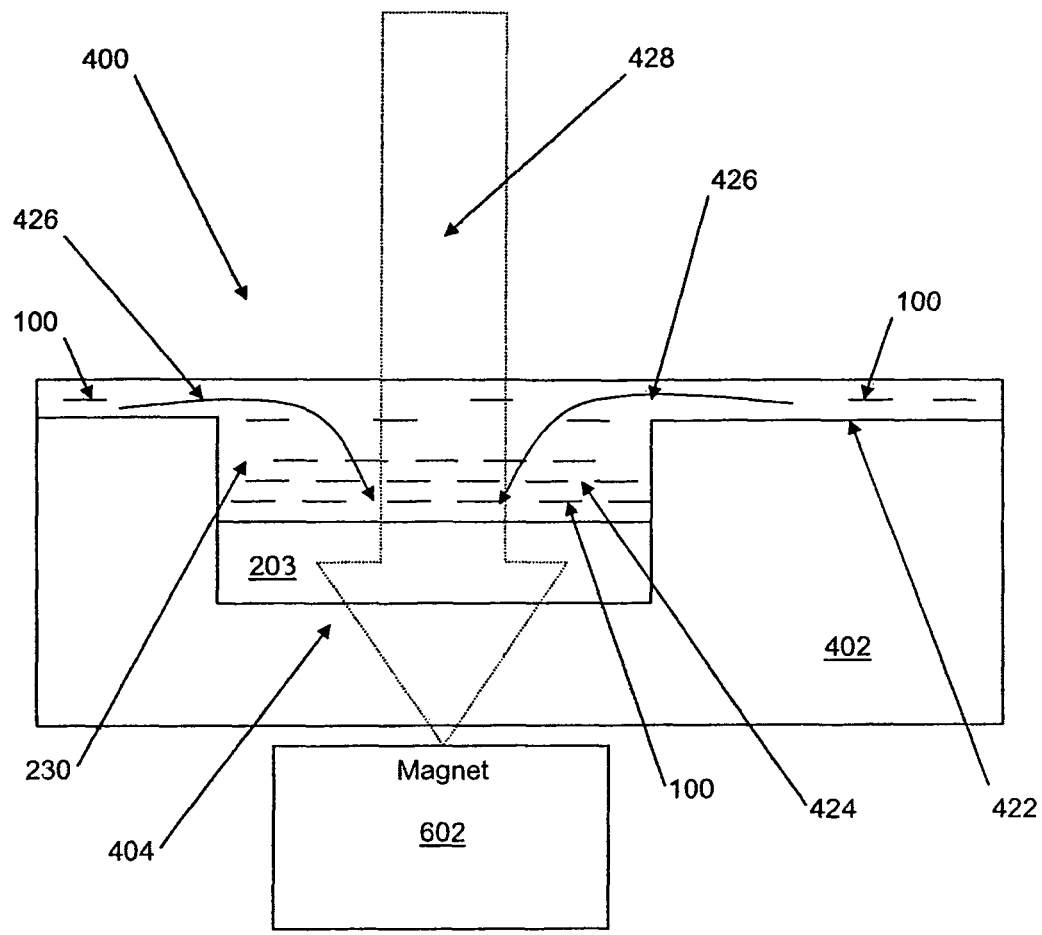
FIG. 14 – Application of Magnetic Field to Data Recording Layer to Draw Nanotubes into Tracks

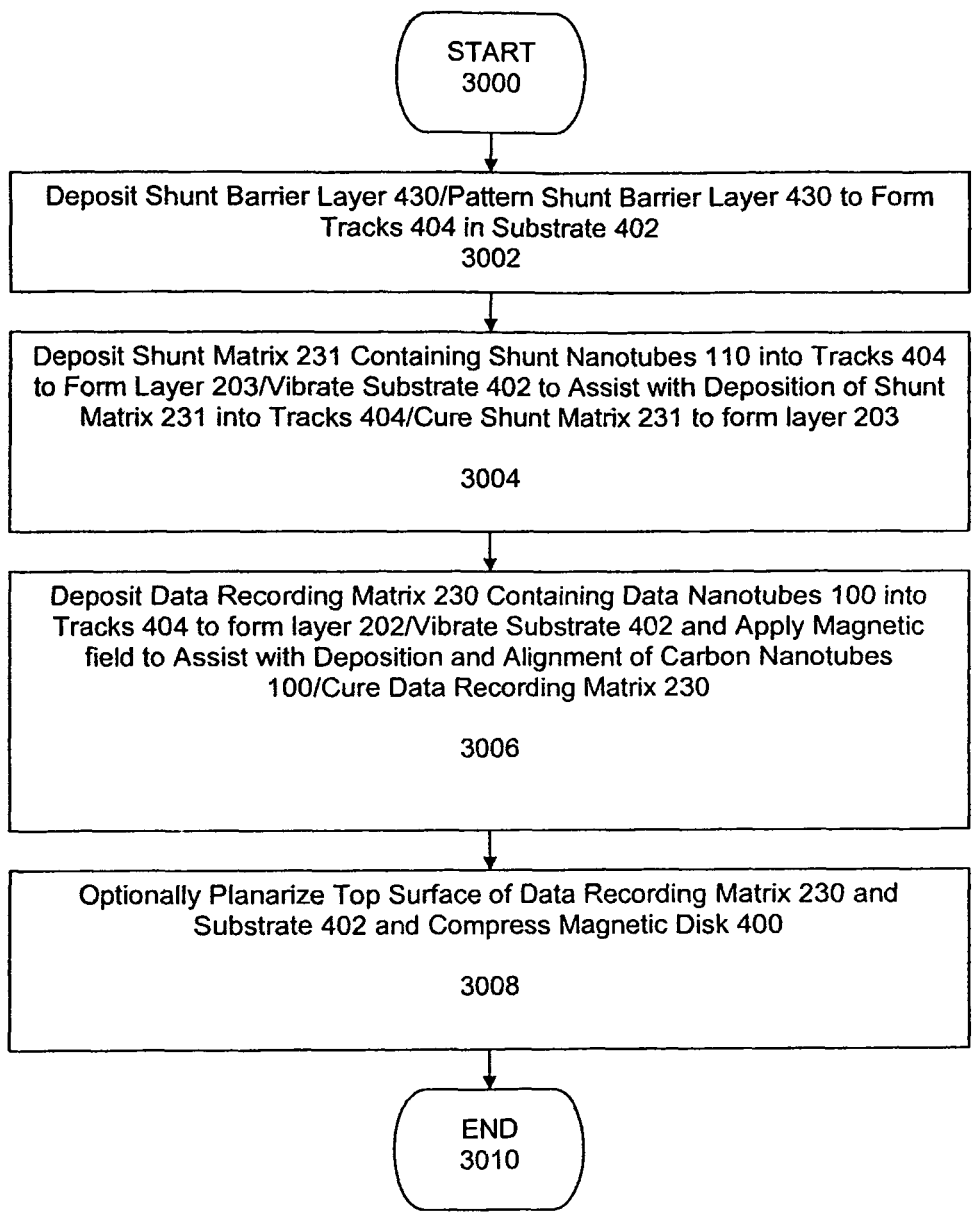
FIG. 15 – A Flow Chart for Manufacturing a Magnetic Disk Having Carbon Nanotubes

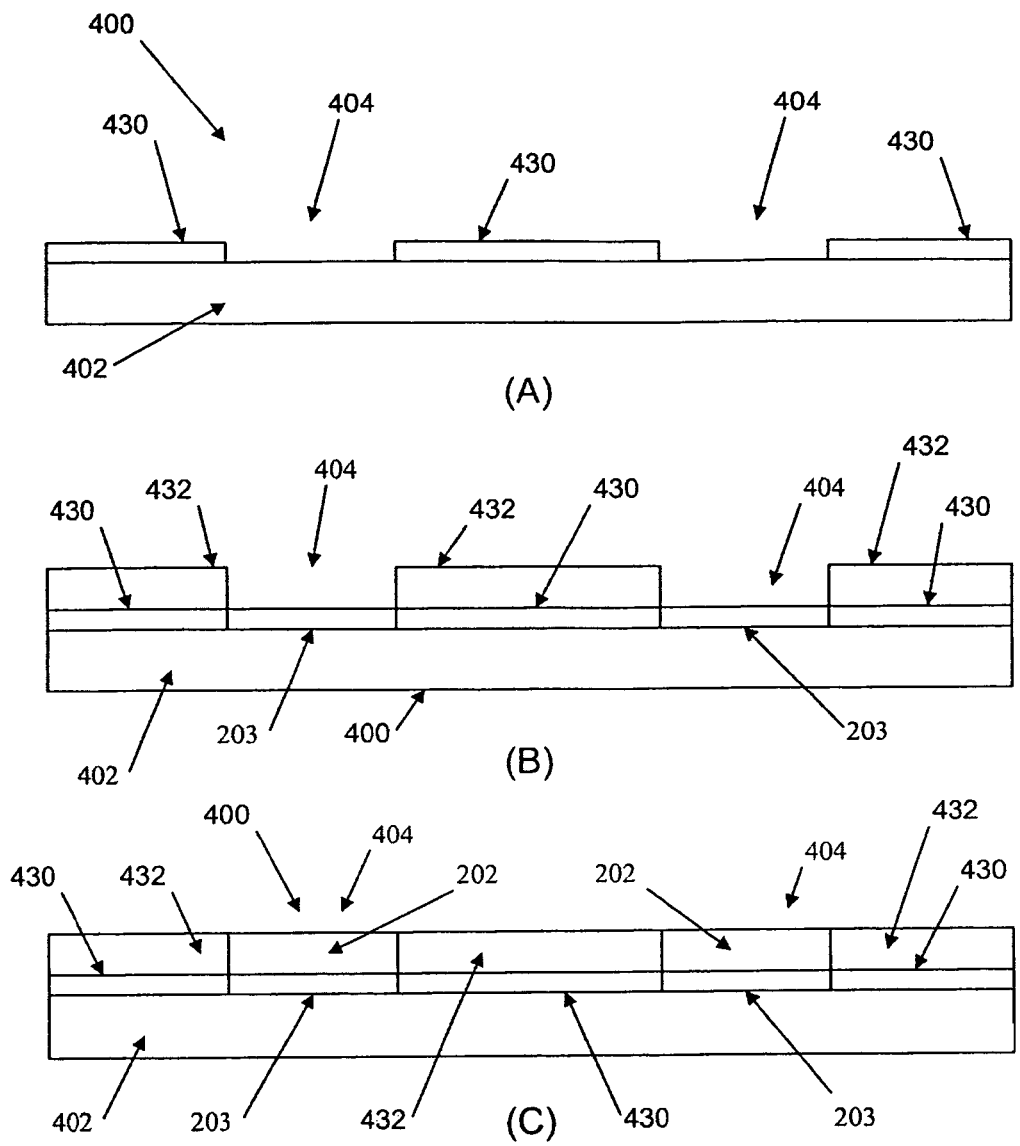
FIG. 16 – Cross-Sectional Flow Diagram for Manufacturing a Magnetic Disk Having Carbon Nanotubes

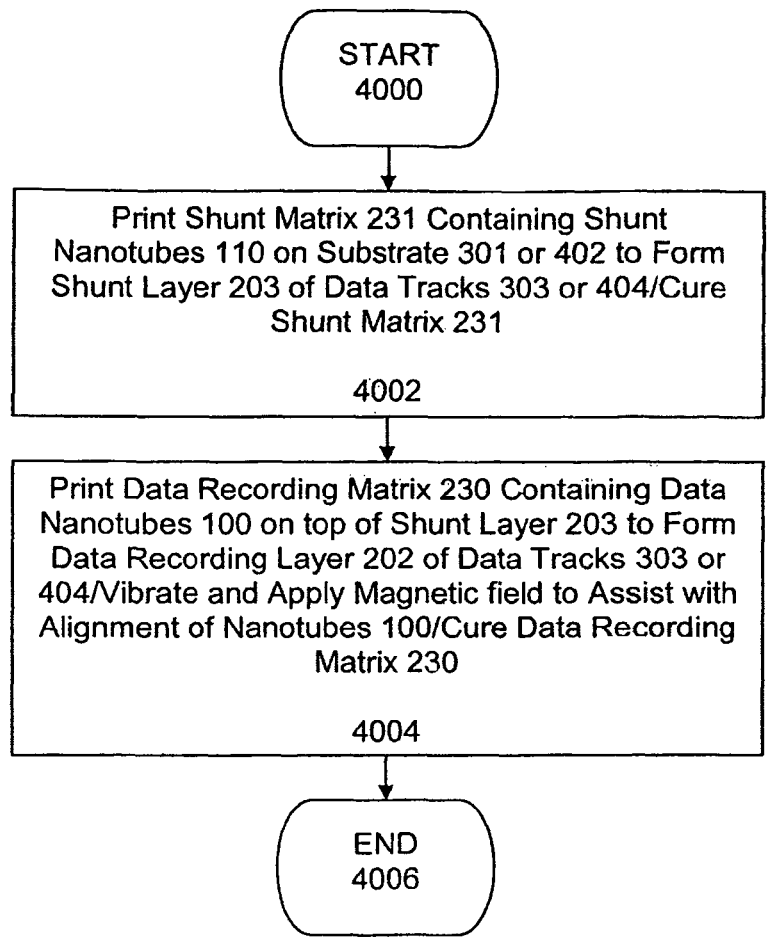
FIG. 17 – A Flow Chart for Manufacturing a Magnetic Tape or a Flexible Magnetic Disk Having Carbon Nanotubes

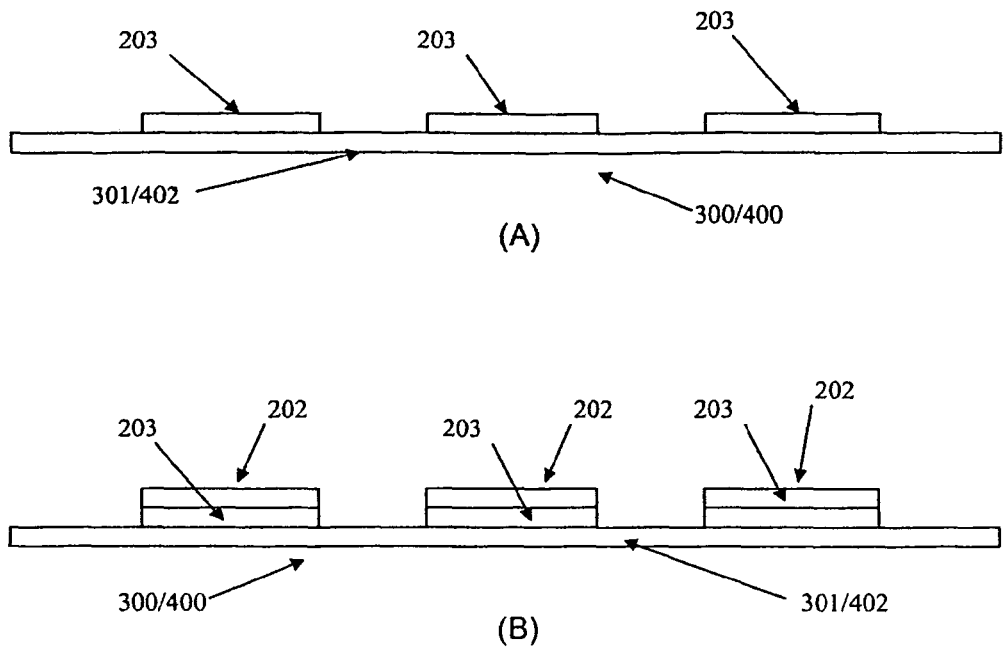
FIG. 18 – Cross-Sectional Flow Diagram for Manufacturing a Flexible Magnetic Disk or Magnetic Tape Having Carbon Nanotubes

US 8,507,032 B2

ORIENTATION OF NANOTUBES CONTAINING MAGNETIC NANOPARTICLES IN A MAGNETIC STORAGE MEDIUM

BACKGROUND

The pursuit of higher performance computing systems is driving the reduction in scale of magnetic storage media. Higher storage densities allow for the reduction of device sizes, an enhancement of device capabilities, and a reduction in data storage costs. To facilitate this increase in magnetic data storage density, industry is constantly searching for structures and processes to reduce the size of information storage sectors and tracks on magnetic tape and magnetic disks.

Current magnetic media technology is based upon the ability to magnetize cells of magnetic materials that are deposited directly on a substrate material. These substrate materials are flexible, in the case of magnetic tape of floppy disks, or rigid, in the case of hard disks. The laws of physics place an eventual limit on the ability to increase the storage density of media that is formed of magnetic particles deposited directly on such a storage tape or disk. In the near future, the magnetic storage media industry will reach this storage density limit. It is therefore essential to find new technologies to replace direct deposition of magnetic materials to facilitate further increases in magnetic storage media density.

SUMMARY

The present is disclosure provides a magnetically enhanced method of curing a data layer of a magnetic storage medium formed of magnetic nanoparticles that are encapsulated within carbon nanotubes, which are arranged on a substrate to facilitate the reading and writing of information by a read/write head. The substrate may be flexible or rigid.

Information is stored on the magnetic nanoparticles via the read/write head of a storage device. These magnetic nanoparticles are arranged into data tracks to store information through encapsulation within the carbon nanotubes. As carbon nanotubes are bendable, the carbon nanotubes may be arranged on flexible or rigid substrates, such as a polymer tape or disk for flexible media, or a glass substrate for rigid disk. A data layer is formed on top of the substrate. The data layer includes a polymer matrix that encapsulates the nanoparticle filled carbon-tubes. The magnetically enhanced cure is performed to assist in the orientation of carbon nanotubes that encapsulate magnetic nanoparticles with respect to the storage medium. A constant magnetic field is applied to the storage medium before and during the curing of the polymer matrix to assist with the proper orientation of the nanotubes within the data layer. This orientation is then fixed once the polymer matrix is cured.

The use of magnetic nanoparticles to store information facilitates a vast increase in the storage density capability of magnetic storage media. Encapsulation of these magnetic nanoparticles within carbon nanotubes allows for the organization of the magnetic nanoparticles into tracks and sectors of information storage media that a read/write head of a storage device can store information.

BRIEF DESCRIPTION OF THE DRAWINGS

FIG. 1 depicts an isometric view of magnetic nanoparticles encapsulated within a carbon nanotube.

FIG. 2 depicts an isometric view of shunt nanoparticles encapsulated within a shunt carbon nanotube.

FIG. 3 depicts a cross section of a nano-scale magnetic medium having magnetic and shunt nanoparticles encapsulated within respective carbon nanotubes that are on a substrate.

FIG. 4 depicts a view of an arrangement of carbon nanotube data storage tracks on a magnetic tape.

FIG. 5 depicts a view of an arrangement of carbon nanotube data storage tracks on a disk.

FIG. 6 illustrates the magnetically enhanced cure of magnetic tape to assist in the orientation of carbon nanotubes that encapsulate magnetic nanoparticles.

FIG. 7 illustrates the magnetically enhanced cure of a magnetic disk to assist in the orientation of carbon nanotubes that encapsulate magnetic nanoparticles.

FIG. 8 illustrates a magnetic tape having carbon nanotubes in various orientations within a data track.

FIG. 9 illustrates a magnetic disk having carbon nanotubes in various orientations within an annular data track.

FIG. 10 illustrates a magnetic disk having carbon nanotubes in various orientations within a spiral data track.

FIG. 11 illustrates a flow chart for manufacturing a magnetic disk having carbon nanotubes.

FIG. 12 illustrates a cross-sectional flow diagram for manufacturing a magnetic disk having carbon nanotubes.

FIG. 13 illustrates a flow chart for manufacturing a data recording layer.

FIG. 14 illustrates formation of a data recording layer.

FIG. 15 illustrates a flow chart for manufacturing a magnetic disk having carbon nanotubes.

FIG. 16 illustrates a cross-sectional flow diagram for manufacturing a magnetic disk having carbon nanotubes.

FIG. 17 illustrates a flow chart for manufacturing a magnetic tape or a flexible magnetic disk having carbon nanotubes.

FIG. 18 illustrates a cross-sectional flow diagram for manufacturing a magnetic tape or a flexible magnetic disk having carbon nanotubes.

DETAILED DESCRIPTION

FIG. 1 shows magnetic carbon nanotube assembly 100 comprising carbon nanotube 101. Carbon nanotube 101 is illustrated as a single-wall hollow tube formed of a single layer of carbon atoms in either hexagonal lattice pattern 102 or 112 (FIG. 2). Since carbon nanotube 101 is hollow, it can contain nanoparticles 103 and 104. Carbon nanoparticle 103 has a high magnetic coercivity so that it can permanently retain a first magnetic field until that field is changed to a second magnetic field. Also, nanoparticle 103 is a particle which does not oxidize or rust on ambient air, such as $CrO_2$ (chromium dioxide). Such oxidation would cause the loss of the stored magnetic field. Nanoparticle 104 also has a high magnetic coercivity, so that it can permanently retain a first magnetic field until that field is changed to a second magnetic field. Nanoparticle 104 contains high coercivity core 105 which holds the permanent magnetic field. To prevent oxidation, core 105 is encapsulated in shell 106. An example of core 105 is pure Fe (iron) and shell 106 is iron oxide, such as $Fe_2O_3$, which can be formed for example by chemical vapor deposition (CVD) or atomic layer deposition (ALD). Another example of shell 106 is aluminum oxide, $Al_2O_3$, commonly referred to as alumina, which can be formed for example by chemical vapor deposition (CVD). Another example of shell 106 is a diamond-like film coating. Amorphous (a-C) and hydrogenated amorphous carbon (a-C:H) diamond-like films have high hardness, low friction, electrical insulation, chemical inertness, optical transparency, biological compatibility, ability to absorb photons selectively, smoothness, and resistance to wear. Several methods have been developed for producing diamond-like carbon films: primary ion beam deposition of carbon ions (IBD); sputter deposition of carbon with or without bombardment by an intense flux of ions (physical vapor deposition or PVD); and deposition from an RF plasma, sustained in hydrocarbon gases, onto substrates negatively biased (plasma assisted chemical vapour deposition or PACVD). Silicon and Silicon Oxide, Si and $SiO_2$, or any oxide, may also be used for shell 106, which can be formed for example by chemical vapor deposition (CVD).

FIG. 2 shows shunt carbon nanotube assembly 110 comprising carbon nanotube 111. Like carbon nanotube 101, carbon nanotube 111 is illustrated as a single-wall hollow tube preferably formed of a single layer of carbon atoms in either hexagonal lattice pattern 112 or 102 (FIG. 1). Hexagonal lattice 112 is rotated ninety degrees from hexagonal lattice 102 and suitable nanotubes comprising either lattice can be used. Since carbon nanotube 111 is. hollow, it can contain nanoparticles 113 and 114. Carbon nanoparticle 113 has a low or zero magnetic coercivity so that it does not permanently retain a first magnetic field, which allows nanoparticle 113 to act as a magnetic shunt. Also, nanoparticle 113 is a particle which does not oxide or rust in ambient air, such as a soft-ferrite. Nanoparticle 114 also has low or zero coercivity, so that it does not permanently retain a first magnetic field. Nanoparticle 114 contains low or zero coercivity core 115 which provides the desired magnetic shunt. To prevent oxidation, core 115 is encapsulated in shell 116. An exemplary material for nanoparticle 114 is a soft-ferrite. Soft-ferrites, like other shunt materials, duct magnetic flux without retaining any "after field." An example of shell 116 is iron oxide, such as $Fe_2O_3$, which can be formed for example by chemical vapor deposition (CVD) or atomic layer deposition (ALD). Another example of shell 116 is aluminum oxide, $Al_2O_3$, commonly referred to as alumina, which can be formed for example by chemical vapor deposition (CVD). Another example of shell 116 is a diamond-like film coating. Amorphous (a-C) and hydrogenated amorphous carbon (a-C:H) diamond-like films have high hardness, low friction, electrical insulation, chemical inertness, optical transparency, biological compatibility, ability to absorb photons selectively, smoothness, and resistance to wear. Several methods have been developed for producing diamond-like carbon films: primary ion beam deposition of carbon ions (IBD); sputter deposition of carbon with or without bombardment by an intense flux of ions (physical vapor deposition or PVD); and deposition from an RF plasma, sustained in hydrocarbon gases, onto substrates negatively biased (plasma assisted chemical vapour deposition or PACVD). Silicon and Silicon Oxide, Si and $SiO_2$, may also be used for shell 116, which can be formed for example by chemical vapor deposition (CVD).

FIGS. 1-2 shows Z axis along the length of nanotubes 101 and 111. Nanotubes 101 and 111 can either be Single-Walled carbon NanoTubes (SWNT) or Multi-Walled carbon NanoTubes (MWNT). MWNT's may be formed with 2, 3, or more layers. The diameter D of nanotubes 101 and 111 is measured in nanometers. The diameter of the nanotubes, up to 12 nm, limits the size of nanoparticles 103-104 and 113-114. In addition to those materials already mentioned, exemplary materials for magnetic nanoparticles 103-104 or 113-114 include Cobalt (Co), Cobalt (Co) and their alloys, Cobalt-ferrite, Cobalt-nitride, Cobalt-oxide (Co—O), Cobalt-palladium (Co—Pd), Cobalt-platinum (Co—Pt), Iron (Fe), Iron (Fe) and their alloys, Iron-Gold (Fe—Au), Iron-Chromium (Fe—Cr), Iron-nitride (Fe—N), Iron-oxide ($Fe_3O_4$), Iron-palladium (Fe—Pd), Iron-platinum (Fe—Pt), Fe—Zr— Nb—B, Mn-nitride (Mn—N), Nd—Fe—B, Nd—Fe—B—Nb—Cu, Nickel (Ni), Nickel (Ni) and their alloys, and soft-ferrite. These magnetic nanoparticles can be manufactured with sizes of 10 mm or less, such that these nanoparticles can fit within nanotubes 101 and 111. Examples of soft-ferrites include Mn—Zn, single crystal Mn—Zn, and Ni—Zn.

FIG. 3 shows magnetic storage medium 200. The T axis is along the thickness direction of magnetic storage medium 200. If magnetic medium 200 is magnetic tape, then the L axis is along the length of the tape and the W axis is along the width of the tape. Magnetic storage medium 200 comprises substrate 201, data recording layer 202, and optional shunt layer 203 in between substrate 210 and data recording layer 202. For magnetic tape and floppy disks, substrate 201 is typically polytetrafluoroethelyne (PTFE), which is commonly known by the trade name MYLAR™. For hard disks, substrate 201 can be aluminum, glass, or a stiff plastic, such as polycarbonate Data recording layer 202 comprises a plurality magnetic carbon nanotube assemblies 100 which are embedded in a polymer matrix, such as HDPE 230 (High Density Poly Ethylene). Alternately, nanotube assemblies 100 are first encapsulated in HDPE and then embedded in a second polymeric matrix. Nanotubes 100 provide a home for nanoparticles 103-104, so they do not clump into large masses within the data recording layer. Nanotubes 100 may be infused into matrix 230 while matrix 230 is in a liquid form. Matrix 230 may be then coated on to substrate 201 to form data layer 202. As described in FIGS. 6-10, a magnet 601 may be used to orient nanotubes 100 within matrix 230 with respect to substrate 201. Once nanotubes 100 have been moved into a desired orientation by a magnetic field, matrix 230 may then be cured, thereby making the orientation of nanotubes permanent.

Shunt layer 203 comprises a plurality magnetic carbon nanotube assemblies 110 which are embedded in a matrix comprising HDPE 231. Alternately, nanotube assemblies 110 are first encapsulated in HDPE and then embedded in a second polymeric matrix. Nanotubes 110 provide a home for the shunt nanoparticles 113-114, so they do not clump into large masses within the shunt layer. Use of shunt layer 203 is optional, but it yields improved data recording when included in magnetic storage medium 200. Nanotubes 110 may be infused into shunt matrix 231 while shunt matrix 231 is in a liquid form. Matrix 231 may be then coated on to substrate 201 to form shunt layer 203. As described in FIGS. 6-10, a magnet 601 may be used to orient nanotubes 110 within shunt matrix 231 with respect to substrate 201. Once nanotubes 100 have been moved into a desired orientation by a magnetic field, shunt matrix 231 may then be cured, thereby making the orientation of nanotubes permanent.

Magnetic recording head 210 comprises write element 212 mounted on a soft ferrite matrix 211. Write element 212 is essentially a U-shaped piece of low coercivity material and a wire coil, which forms an electro-magnet. That portion of write element 212 adjacent to magnetic storage medium 200 is open, to allow magnetic flux 213 to leave recording head 210 and penetrate magnetic storage medium 200 and imprint data in the form of 1's and 0's based on the magnetic polarity of flux 213. Shunt layer 203 completes the magnetic circuit (analogous to completing an electrical circuit) and keeps flux 213 from "fringing" excessively. Shunt layer 203 permits more crisp edge transitions, thus permitting higher data densities on magnetic storage medium 200. Thus, data is stored in layer 202 with the assistance of shunt layer 203. Similarly, shunt layer 203 can assist in the reading of data. Write element 212 may further comprise a Metal-In-Gap (MIG) write head.

Data is read from magnetic storage medium 200, by means of a non-limiting example, via a magnetoresistive head, a spin-valve head which is alternately knows as a giant magnetoresistive "GMR" head, or a tunnel magnetoresistive "TMR" head.

The process for forming magnetic storage medium 200 is to first apply shunt layer 203 onto substrate 201. This may be done as a thin monolayer of nanotubes by running magnetic tape through a solution of HDPE 231 containing nanotubes 110. This may also be done as a thin monolayer of nanotubes 100 by spin coating a solution of HDPE 231 containing nanotubes 100 onto a magnetic disk. Multiple shunt monolayers can be layered on top of the first monolayer forming shunt layer 203 through repeating this process. To maximize dispersal of nanotubes 100 and 110, ethylene or another material that disperses carbon nanotubes may be used.

Once shunt layer 203 is cured, which may include supplemental heating or compression by rollers, data recording layer 202 is then added. This may be done as a thin monolayer of nanotubes by running magnetic tape through a solution of HDPE 230 containing nanotubes 100, and then curing the data layer 202. This may also be done as a thin monolayer of nanotubes 100 by spin coating a solution of HDPE 230 containing nanotubes 100 onto a disk, and then curing the data layer. Multiple data recording monolayers can be layered on top of the first monolayer forming data layer 202 through repeating this process. To maximize dispersal of nanotubes 100 and 110, ethylene another material that disperses carbon nanotubes may be used. Nanotubes 100 and 110 may be coated with an initial shell of HDPE before being added to HDPE 230 and 231.

FIG. 4 shows magnetic tape media 300 comprising substrate 301, magnetic data-recording layer 202, and shunt layer 203. The L axis is along the length of tape 300, the W axis is along the width of the tape, and the T axis is along the thickness of the tape. Tape media 300 has substrate 301 typically formed of polytetrafluoroethelyne (PTFE), which is commonly known by the trade name MYLAR™. Shunt layer 203 is formed on substrate 301. Shunt layer 203 is formed of a monolayer of shunt carbon nanotube assemblies 110. Assemblies 110 include carbon nanotubes 111 containing nanoparticles 113 and 114. Carbon nanoparticle 113 has a low or zero magnetic coercivity so that it does not permanently retain a first magnetic field, which allows nanoparticles 103 to act as a magnetic shunt. Data recording layer 202 is formed of a monolayer of carbon nanotube assemblies 100. Assemblies 100 include carbon nanotubes 101 which contain nanoparticles 103 and 104. Carbon nanoparticle 103 has a high magnetic coercivity so that it can permanently retain a first magnetic field until that field is changed to a second magnetic field, allowing for data storage. Carbon nanotubes 101 and 111 are oriented such that they are generally parallel to the length wise direction tape media 300. Data tracks 303 are shown, from magnetic flux transitions recorded by magnetic head 210 in magnetic data-recording layer 202.

FIG. 5 shows magnetic disk 400 with monolayer rings 404 of layer 202 and 203 formed in layers about the center 406 of disk 400. These layers may be further masked into individual rings 404. Rings 404 may be formed as distinct rings on disk 400 to form independent tracks. If disk 400 is a hard disk, substrate 402 can be aluminum, glass, or a stiff plastic, such as polycarbonate. If disk 400 is a floppy disk, substrate 402 is typically polytetrafluoroethelyne (PTFE), which is commonly known by the trade name MYLAR™. Z is the direction perpendicular to the disk and the R axis is the radial direction. Shunt layer 203 is formed of a monolayer of shunt carbon nanotube assemblies 110. Assemblies 110 include carbon nanotubes 111 containing nanoparticles 113 and 114. Carbon nanoparticle 113 has a low or zero magnetic coercivity so that it does not permanently retain a first magnetic field, which allows nanoparticle 113 to act as a magnetic shunt. Data recording layer 202 is formed of a monolayer of carbon nanotube assemblies 100. Assemblies 100 include carbon nanotubes 101 which contain nanoparticles 103 and 104. Carbon nanoparticle 103 has a high magnetic coercivity so that it can permanently retain a first magnetic field until that field is changed that field is changed to a second magnetic field, allowing for data storage. Carbon nanotubes 101 and 111 may be oriented such that they extend radially from the center of disk 400. Alternatively, carbon nanotubes 101 and 111 may be oriented such that they extend in a spiral pattern from the center of the disk 400.

One method of forming rings 404 is through a photoetching process. Layers 202 and 203 are first deposited onto disk 400 preferably through a spin coating process. A layer of photoresist material is then deposited on top of layers 202 and 203. This layer of photoresist is exposed through a mask, thereby patterning layers 202 and 203. A removal process leaves the patterned layers 202 and 203. While shown as rings 404, layers 202 and 203 may be patterned into any desirable track or sector pattern for data storage. Alternatively, when disk 400 is made of polycarbonate, rings 404 could be formed through a molding process. A top surface of data recording layer 202 may further comprise buckyballs 299, which would act to reduce friction between the recording layer 202 and the magnetic head 210.

FIG. 6 illustrates the magnetically enhanced cure of magnetic tape to assist in the orientation of carbon nanotubes that encapsulate magnetic nanoparticles. FIG. 7 illustrates the magnetically enhanced cure of a magnetic disk to assist in the orientation of carbon nanotubes that encapsulate magnetic nanoparticles. By use of magnet 601, a constant magnetic field is applied to the magnetic tape 300 and disk 400 to assist with the proper orientation of the nanotube assemblies 100 while tape 300 and disk 400 is cured (polymer matrix 230 containing nanotube assemblies 100 and 110 adheres to the substrate 201 and 301). Nanotube assemblies 100 are free to move within polymer matrix 230 prior to the curing of polymer matrix 230 as polymer matrix 230 is in a liquid, gel, or powdered state when initially applied to substrate 301 or 402. Matrix 231 may also be applied in a liquid, gel, or powdered state. When nanotube assemblies 100 are free to move within polymer matrix 230, magnet 601 is able to assist in the orientation of nanotube assemblies 100 with respect to magnetic tape 300 or disk 400 by applying a magnetic field that acts upon nanotube assemblies 100. Note that within a preferred embodiment, nanotube assemblies 100 are only present within data tracks 303 and 404. In this preferred embodiment, the space between data tracks 303 and 404 is preferably void of any nanotube assemblies 100. Magnet 601 is merely drawn in FIGS. 6 and 7 as being exemplary of the application of magnetism relative to magnetic tape 300 or disk 400. Specific magnet configurations that can create suitable field lines to properly orient carbon nanotubes 101 as shown in FIGS. 8, 9 and 10 are well known and exist in many varieties, and for example are disclosed in the publication authored by Oleg D. Jefimenko, *Electricity and Magnetism: An Introduction to the Theory of Electric and Magnetic Fields*, second edition, (ISBN 0-917406-08-7), which is hereby incorporated by reference. Nanotube assemblies 100 preferably contain more than one nanoparticle 103/104 so that magnet 601 can magnetically align nanotubes 101.

By applying the magnetic field, magnet 601 is able to orient nanotube assemblies 100 into a generally uniform orientation with respect to substrates 301 or 402. For example, magnet 601 may be manipulated with respect to magnetic tape 300 to orient nanotube assemblies 100 parallel to the lengthwise axis of each data track. Alternatively, magnet 601 may be manipulated with respect to magnetic tape 300 to orient nanotube assemblies 100 perpendicular to the lengthwise axis of each data track. Magnet 601 may be manipulated with respect to disk 400 to orient nanotube assemblies 100 radially with respect to the center of disk 400. Alternatively, magnet 601 may be manipulated with respect to disk 400 to orient nanotube assemblies 100 parallel to the direction of data rings 404 such that each nanotube is generally perpendicular the radial axis of disk 400. Please note that these orientations shown in this Figure are merely exemplary and any alignment of nanotubes is conceived. Magnet 601, which may be either a permanent magnet or an electromagnet, exerts a constant magnetic field on tape 300 and disk 400 as the polymer matrix cures. If magnet 601 is a permanent magnet, it may be made out of magnetized soft iron. If magnet 601 is an electromagnet, then a electrical coil (not shown) is wound around the ferrite body of magnet 601 and when a DC current flows through this electrical coil, a magnetic field is created.

FIG. 8 illustrates a magnetic tape 300 having carbon nanotubes 101 in various orientations within a data track 303. Magnet 601 can align carbon nanotubes 101 to an orientation 305 in which the longitudinal axis of carbon nanotubes 101 is parallel to the lengthwise axis of data track 303. Alternatively, magnet 601 can align carbon nanotubes 101 to an orientation 306 in which the longitudinal axis of carbon nanotubes 101 is rotated 45 degrees with respect to the lengthwise axis of data track 303. In addition, magnet 601 can align carbon nanotubes 101 to an orientation 307 in which the longitudinal axis of carbon nanotubes 101 is perpendicular to the lengthwise axis of data track 303. The areas 304 between each data track 303 may, in a preferred embodiment, be void of any carbon nanotubes 101. In a preferred embodiment, shunt layer 203 is not present in areas 304. A pair of parallel plates in a configuration like a capacitor could generate a magnetic field between the plates having linear magnetic field lines that could create a magnetic field that would orient nanotubes 101 in the manner shown in orientations 305, 306, or 307. For example, having data tracks 303 run parallel to the magnetic field lines would create the orientation 305. Rotating data tracks 303 by 45 degrees with respect to the magnetic field lines would create the orientation 306. Positioning the data tracks 303 to run perpendicular to the magnetic field lines would create the orientation 307. Please note that these magnet 601 and magnetic tape 300 orientations are based upon the carbon nanotubes orienting themselves parallel to the magnetic field lines. Also, please note that these orientations shown in this Figure are merely exemplary and any alignment of nanotubes is conceived.

FIG. 9 illustrates a magnetic disk 400 having carbon nanotubes 101 in various orientations within an annular data track 404. Magnet 601 can align carbon nanotubes 101 to an orientation 410 in which the longitudinal axis of carbon nanotubes 101 is parallel to a tangent of annular data track 404. For example, an isolated uniformly charged sphere or rod placed at the center 406 of disk 400 would create magnetic field lines that would orient nanotubes 101 in the manner shown in orientation 410. Alternatively, magnet 601 can align carbon nanotubes 101 to an orientation 412 in which the longitudinal axis of carbon nanotubes 101 is rotated 45 degrees with respect to a radial axis of disk 400. In addition, magnet 601 can align carbon nanotubes 101 to an orientation 408 in which the longitudinal axis of carbon nanotubes 101 is aligned to a radial axis of disk 400. For example, a uniformly charged rod extending through center 406 with a uniformly charged cylinder surrounding disk 400 could create a magnetic field that would orient nantubes 101 in the manner shown in orientation 408. Alternatively, placing a uniformly charged sphere at the center 406 and surrounding disk 400 with another uniformly charged sphere could create magnetic field lines that would orient nanotubes 101 in the manner shown in orientation 408. The areas 407 between each data track 404 may, in a preferred embodiment, be void of any carbon nanotubes 101. In a preferred embodiment, layer 202 is present only in data tracks 404. However, carbon nanotubes 111 may still be present within areas 407. In a preferred embodiment, shunt layer 203 is not present in areas 407. Alternatively, shunt layer 203 may extend partially into areas 407 on either side of data track 404 to prevent fringing at the boundaries of data track 404. Please note that these orientations shown in this Figure are merely exemplary and any alignment of nanotubes is conceived.

FIG. 10 illustrates a magnetic disk 400 having carbon nanotubes 101 in various orientations within a spiral data track 414. Magnet 601 can align carbon nanotubes 101 to an orientation 420 in which the longitudinal axis of carbon nanotubes 101 is parallel to a tangent of spiral data track 414. Alternatively, magnet 601 can align carbon nanotubes 101 to an orientation 418 in which the longitudinal axis of carbon nanotubes 101 is rotated 45 degrees with respect to a tangent of spiral data track 414. In addition, magnet 601 can align carbon nanotubes 101 to an orientation 422 in which the longitudinal axis of carbon nanotubes 101 is perpendicular to a tangent of spiral data track 414. The areas 416 between each data track 414 may, in a preferred embodiment, be void of any carbon nanotubes 101. In a preferred embodiment, layer 202 is present only in data tracks 414. Preferably, shunt layer 203 is not be present in areas 416 or shunt layer 203 may extend partially into areas 416 on either side of data track 414 to prevent fringing at the boundaries of data track 414.

FIG. 11 illustrates a flow chart for manufacturing a magnetic disk 400 having carbon nanotubes 101 and 111. This flow chart begins at START, step 1000. Substrate 402 for magnetic disk 400 is, in one embodiment, a rigid substrate made for example of glass, aluminum, or an aluminum oxide. Substrate 402 is manufactured to have tracks 404 formed in substrate 402 in step 1002. Tracks 404 may be formed, for example, by a stamping process with a glass substrate. Alternatively, for example, tracks 404 may be formed through a photolithography process. Note that for FIGS. 11-16, tracks 414 may be substituted for tracks 404. Once tracks 404 are formed, shunt matrix 231 containing shunt nanotube assemblies 110 are deposited intro tracks 404 to form layer 203 in step 1004. Shunt matrix 231 may be in liquid, gel, or powdered form. During the deposition of shunt matrix 231 containing shunt nanotube assemblies 110, substrate 404 may be vibrated to aid shunt matrix 231 with filling tracks 404. Substrate 404 may be vibrated with subsonic, sonic, or ultra-sonic vibrations. While being deposited, shunt matrix 231 is preferably in a liquid state, or may be in a gel, or powdered state. Once shunt matrix 231 is deposited within tracks 404, shunt matrix 231 is cured into a solid state. In step 1006, data recording matrix 230 containing nanotube assemblies 100 is deposited into tracks 404 to form layer 203. Substrate 402 is vibrated with subsonic, sonic, or ultra-sonic vibrations to assist data recording matrix with filling tracks 404. Data recording matrix 230 is preferably in a liquid state FIG. 12 illustrates a cross-sectional flow diagram for manufacturing a magnetic disk 400 having carbon nanotubes 101 and 111 in accordance with the process described in FIG. 11. In view A, tracks 404 are formed in substrate 402 as described above in step 1002. Note that tracks 404 form a channel. In view B, shunt layer 203 is deposited within tracks 404 as described above in step 1004. In view C, data recording layer 202 is deposited within tracks 404 as described above in steps 1006 and 1008.

FIG. 13 illustrates a flow chart for manufacturing a data recording layer 202. The manufacturing process begins with step 2000 when liquid data recording layer matrix 230 has been deposited on substrate 402 and within data tracks 404. Data recording matrix 230 may also be applied in powdered or gel form. In step 2002, a magnet 602, shown in FIG. 14, creates a magnetic field 428 through track 404 that acts upon nanotube assemblies 100. Magnetic field 428 draws carbon nanotubes 100 along paths 426 from the upper portion 422 of data recording layer matrix 230 down into the lower portion 424 of data recording matrix 230 within track 404, thereby creating an increased concentration of nanotubes 100 within track 404. In step 2004, substrate 402 is then vibrated to aid the data recording layer matrix 230 with filling track 404. In addition, vibrating substrate 402 aids magnet 601 with orienting nanotubes 100 with respect to track 404. Once nanotubes 100 are in the proper orientation, data recording matrix 230 is cured into a solid state, step 2006, thereby forming layer 202. In step 2010, data recording layer 202 may be planarized to be flush with the sidewalls formed in substrate 402 that extend on either FIG. 14 illustrates an exemplary formation of a data recording layer 202 in accordance with the process described in FIG. 13. Magnet 602, is shown in this exemplary embodiment, to be positioned underneath data track 404. The magnetic field 428 generated by magnet 602 pulls nanotubes 100 down into track 404. Consequently, upper portions 422 of data recording matrix 230 have lower concentrations of nanotubes 100 than lower portion 424 of data recording matrix 230 within track 404 over shunt layer 203. Thus, this process increases the density of carbon nanotubes 100 within track 404 than otherwise existed in data recording matrix 230 when it was deposited.

FIG. 15 illustrates a flow chart for manufacturing a magnetic disk 400 having carbon nanotubes 101 and 111. The process begins in step 3000. A shunt barrier layer 430 is deposited over substrate 402 in step 3002. Shunt barrier layer 430 may be comprised of a shunt matrix 231 material that does not include nanotube assemblies 110. Alternatively, shunt barrier layer 430 may be formed of an oxide, silicon, glass, or other material. Shunt barrier layer 430 is then patterned to form tracks 404 through a photolithographic process, a stamping process, or other process capable of forming channels 404. In step 3004, shunt matrix 231 containing shunt nanotubes 110 is deposited into tracks 404 to form layer 203. Substrate 402 is then vibrated to assist the liquid shunt matrix 231 with filling tracks 404. Shunt matrix 231 is then cured into a solid state to form layer 203. In step 3006, data recording matrix 230 containing nanotubes 100 is deposited into tracks 404 to form layer 202. Substrate 402 is sonically or sub-sonically vibrated to assist the liquid data recording matrix 230 with filling tracks 404. In addition, substrate 402 is then vibrated to assist magnet 601 with orienting nanotubes 100 within tracks 404. Once nanotubes 100 are oriented into a desired position, data recording matrix 230 is cured into a solid state thereby forming layer 202. In step 3008, data recording layer 202 may be planarized to be flush with the sidewalls formed in substrate 402 that extend on either side of channel 404. Disk 400 may then be optionally compressed. This process then terminates in step 3010.

FIG. 16 illustrates a cross-sectional flow diagram for manufacturing a magnetic disk 400 having carbon nanotubes 101 and 111 in accordance with the process described in FIG. 15. In view A, tracks 404 are formed in substrate 402. In view B, shunt layer 203 is deposited within tracks 404. In view C, data recording layer 202 is deposited within tracks 404.

FIG. 17 illustrates a flow chart for manufacturing a magnetic tape 300 or a flexible magnetic disk 400 having carbon nanotubes 101 and 111. The process beings with step 4000. In step 4002, shunt matrix 231 containing shunt nanotubes 110 is printed onto substrate 301 or 402 to form tracks 303 or 404. Shunt matrix containing shunt nanotubes 110 maybe in a liquid state that is then cured into a solid state to form shunt layer 203, or a powder form that is then baked into a solid state to form shunt layer 203. In step 4004, data recording matrix 230 containing nanotubes 100 is printed on top of shunt layer 203 in tracks 303 or 404. Data recording matrix containing nanotubes 100 maybe in a liquid state that is then cured into a solid state to form data recording layer 202, or a powder form that is then baked into a solid state to form data recording layer 202. The process then ends in step 4006.

FIG. 18 illustrates a cross-sectional flow diagram for manufacturing a magnetic tape 300 or a flexible magnetic disk 400 having carbon nanotubes 100 or 101 in accordance with the process described in FIG. 17. In view A, tracks 303 or 404 are formed by printing layer 203 on substrate 301 or 402. In view B, tracks 303 or 404 are further formed by printing layer 202 on top of layer 203. Note that while shown printed on a substrate 301 or 402, ink containing carbon nanotubes 100 having magnetic particles may be printed on any other printable surface and used for applications that include, for example, RFID applications, bar codes, or other printed identifiers. In addition, carbon nanotubes containing magnetic nanoparticles may be infused in a pattern in paper currency to reduce the possibility of counterfeiting.

While the technology has been shown and described with reference to a particular embodiment thereof, it will be understood to those skilled in the art, that various changes in form and details may be made therein without departing from the spirit and scope of the invention disclosure.

I claim:
1. A method, comprising:
  obtaining a nanotube having contained therein a magnetic nanoparticle, said nanotube being contained within a non-solid matrix;
  depositing said non-solid matrix into a channel formed on a substrate;
  applying a drawing magnetic field to draw said nanotube down into said channel;
  applying an orienting magnetic field to said nanotube in said non-solid matrix to move said nanotube into a desired orientation; and
  curing said non-solid matrix into a solid state to provide a solid matrix, thereby making said desired orientation of said nanotube permanent within said solid matrix.

2. The method of claim 1, wherein said magnetic nanoparticle is encapsulated within a shell, said shell being contained within said nanotube, wherein said shell is made from a material selected from the group consisting of an oxide, iron oxide, aluminum oxide, silicon oxide, silicon, and diamond-like film such as hydrogenated amorphous carbon and amorphous carbon.

3. The method of claim 1, further comprising forming a data layer over a substrate by coating said substrate with said non-solid matrix that contains said nanotube.

4. The method of claim 1, further comprising:
  forming a shunt layer intermediate a substrate and a data layer comprising said nanotube containing said magnetic nanoparticle by coating said substrate with a non-solid shunt matrix that contains a shunt nanotube that contains a shunt nanoparticle; and curing said shunt matrix into a solid form.

5. The method of claim 1, further comprising applying said non-solid matrix to a substrate for a magnetic tape.

6. The method of claim 1, further comprising applying said non-solid matrix to a substrate for a magnetic disk.

7. The method of claim 6, further comprising forming said non-solid matrix into a data track on said magnetic disk.

8. The method of claim 7, wherein said data track is annular.

9. The method of claim 7, wherein said data track has a spiral configuration.

10. The method of claim 1, wherein said non-solid matrix is in one of a powdered, gel, and liquid state.

11. The method of claim 1, further comprising forming a shunt layer within said channel, wherein said shunt layer comprises a plurality of nanotubes that contain shunt nanoparticles.

12. The method of claim 11, further comprising forming a data recording layer above said shunt layer within said channel, wherein said data recording layer comprises a plurality of nanotubes that contain magnetic nanoparticles.

13. The method of claim 1, wherein said magnetic nanoparticle is encapsulated within said nanotube.

14. The method of claim 1, wherein said nanotube is a carbon nanotube.

15. A method, comprising:
obtaining a nanotube having contained therein a magnetic nanoparticle, said nanotube being contained within a non-solid matrix;
applying said non-solid matrix to a substrate for a data track;
applying a magnetic field to said nanotube in said non-solid matrix to move said nanotube into a desired orientation; and
curing said non-solid matrix into a solid state to provide a solid matrix, thereby making said desired orientation of said nanotube permanent within said solid matrix;
wherein said desired orientation is where a longitudinal axis of said nanotube is rotated 45 degrees with respect to an axis of the data track.

16. The method of claim 15, wherein the data track is linear and wherein the axis is a lengthwise axis of the data track.

17. The method of claim 15, wherein the data track is on a magnetic disk and wherein the axis is a radial axis of the magnetic disk.

18. The method of claim 15, wherein the data track is a spiral and the axis is a tangent of the spiral.

19. The method of claim 15, wherein said magnetic nanoparticle is encapsulated within a shell, said shell being contained within said nanotube, wherein said shell is made from a material selected from the group consisting of an oxide, iron oxide, aluminum oxide, silicon oxide, silicon, and diamond-like film such as hydrogenated amorphous carbon and amorphous carbon.

20. The method of claim 15, further comprising forming a data layer over a substrate by coating said substrate with said non-solid matrix that contains said nanotube.

21. The method of claim 15, further comprising:
forming a shunt layer intermediate a substrate and a data layer comprising said nanotube containing said magnetic nanoparticle by coating said substrate with a non-solid shunt matrix that contains a shunt nanotube that contains a shunt nanoparticle; and curing said shunt matrix into a solid form.

22. The method of claim 15, wherein said non-solid matrix is in one of a powdered, gel, and liquid state.

23. The method of claim 15, wherein said magnetic nanoparticle is encapsulated within said nanotube.

24. The method of claim 15, wherein said nanotube is a carbon nanotube.

25. The method of claim 15, further comprising depositing said non-solid matrix into a channel formed on a substrate prior to applying said magnetic field.

26. The method of claim 25, further comprising applying a second magnetic field to draw said nanotubes down into said channel before the application of said magnetic field that orients said nanotube.

27. The method of claim 25, further comprising forming a shunt layer within said channel, wherein said shunt layer comprises a plurality of nanotubes that contain shunt nanoparticles.

28. The method of claim 27, further comprising forming a data recording layer above said shunt layer within said channel, wherein said data recording layer comprises a plurality of nanotubes that contain magnetic nanoparticles.

* * * * *